Sept. 4, 1951        H. W. PETERS        2,567,027
BEVERAGE BREWER
Original Filed March 13, 1944
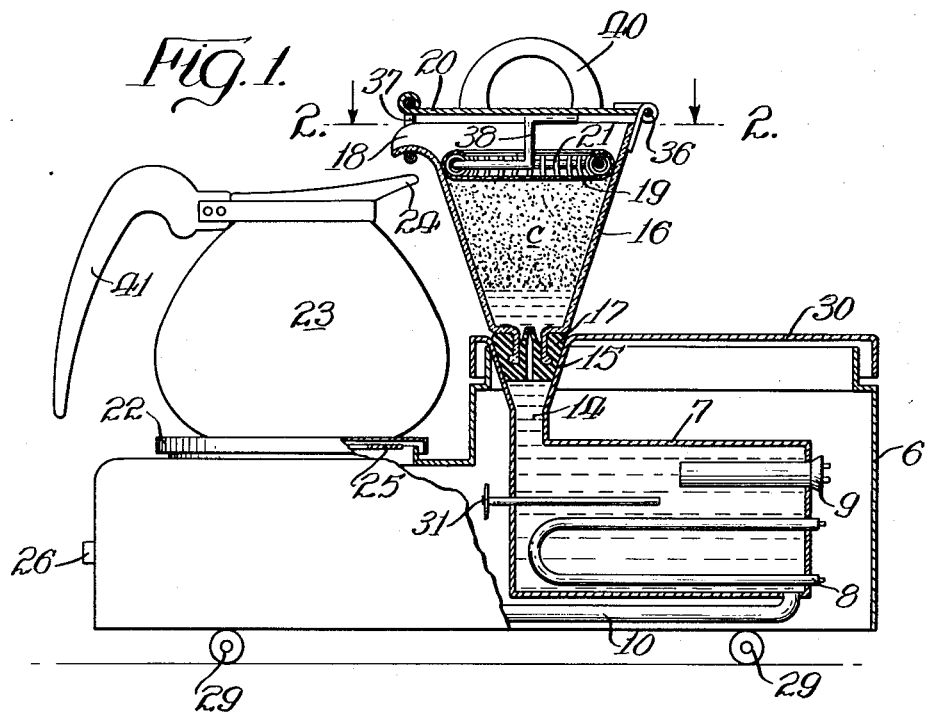
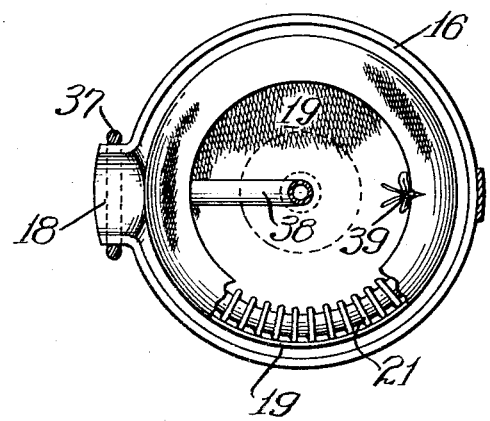
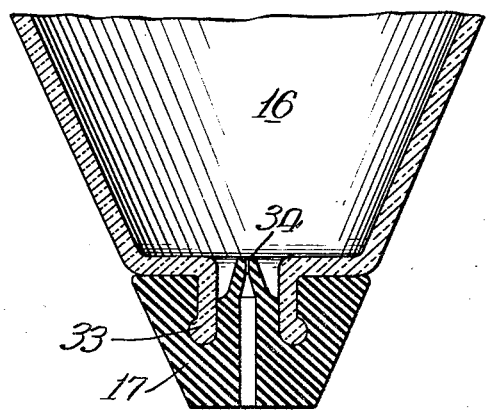
INVENTOR.
Herbert W. Peters Patented Sept. 4, 1951

2,567,027

UNITED STATES PATENT OFFICE 2,567,027

BEVERAGE BREWER

Herbert W. Peters, Milwaukee, Wis., assignor to Cory Corporation, Chicago, Ill., a corporation of Delaware Original application March 13, 1944, Serial No. 526,143. Divided and this application July 29, 1949, Serial No. 107,619

3 Claims. (Cl. 99—303)

This invention relates to a beverage brewer of the general kind which is disclosed in Letters Patent No. 2,346,389, granted to me under date of April 11, 1944. In particular, the present improvements are concerned with an invention which was first disclosed in my application Ser. No. 526,143 filed March 13, 1944 (and since abandoned) of which this case is a division.

The beverage brewer with which I am here concerned is especially adapted for use in establishments where large amounts of coffee or other freshly brewed beverage are dispensed rather frequently. It is important that the beverage equipment have capacity for producing coffee or other infusion of a uniform standard, that the brewing operation proceed as rapidly as permitted by the nature of the ingredients used, and that the apparatus itself be so designed that the operation of replacing one batch of coffee with another may be expedited to avoid unnecessary delay. For convenience coffee will be referred to as the beverage for which the present apparatus is designed, with the understanding, however, that other beverages, such as tea, are also included within this term.

The present apparatus makes use of a cartridge unit of special construction. It is provided with means whereby grounds of coffee which rise therein within the infusion will concurrently be urged upwardly and outwardly to insure an evenly distributed bed of grounds. This is accomplished by admitting fresh hot water into the lower part of the cartridge so that the grounds at this point are floated on the top of the ascending body of water and permitted to spread laterally over a wider area where they tend to fluff up until at the top of the cartridge the grounds are confined by a strainer which is removably fitted there in place. At this point the rising movement of the grounds is arrested, but the infusion from which the grounds are separated will continue to rise and flow out through a pouring spout. A brewing cartridge which so performs in operation is one of the features of this invention.

Another object is the provision of a combined cover and strainer for the cartridge. In such an arrangement the cover is mounted to swing upwardly when fresh grounds are to be introduced into the cartridge, or when vitiated grounds are to be removed therefrom. In this operation the strainer swings upwardly with the cover so as to be removed out of the way, thereby affording full access to the cartridge. No attention need be paid to the strainer when the cover is closed down in operative position since the closing movement of the cover automatically re-positions the strainer operatively in place.

A further object of this invention is the provision of a strainer which, when positioned operatively on the cartridge, will automatically establish a tight connection therewith. In accomplishing this end it is unnecessary that the parts be accurately fashioned to produce a close fit. The construction which I utilize is one where the strainer, when fitted into the cartridge at its top, is caused to engage therewith with an increasing tightness the further the cover is advanced toward its closed position.

A further object of this invention is the provision of a check valve at the bottom of the cartridge where it connects with the heating apparatus from which hot water is conducted upward for delivery into the cartridge. This valve which is affixed to the cartridge is in the form of a resilient plug which establishes a fluid-tight frictional connection with the conduit. As part of the plug itself means is provided for connecting with the bottom of the cartridge, and also for a one-way movement of liquid through the plug into the cartridge, but not reversely therefrom. It is important that the water be not permitted to run back through the plug because at times the entire cartridge must be removed, together with the plug, from the water-heating apparatus. By the means hereinafter to be described this operation may be performed simply and with assurance that there will be no more than a very minor drip from the cartridge when it is so removed.

These and other objects of my invention which will hereinafter be described in detail, may advantageously be embodied in an apparatus as illustrated in the accompanying drawing wherein—

Figure 1 is an end view of a commercial form of coffee brewing apparatus with parts thereof broken away to show in vertical section the present cartridge and its associated parts;

Fig. 2 is a horizontal section, taken on line 2—2 of Fig. 1; and

Fig. 3 is an enlarged detail in vertical section of the lower end portion of the cartridge and its associated check valve.

The improved beverage producer shown therein, comprises in general a main housing 6; a fresh water supply and heating chamber 7 confined and concealed within the housing 6 and having therein a main electric heater 8 and an auxiliary heater 9; a fresh water supply line 10 communicating with the bottom of the supply chamber 7 and a hot water riser 14 communicating with the upper portion of the chamber 7 and having a discharge mouth in the form of a tapered socket 15 at the upper extremity thereof; a transparent coffee grounds confining container 16 constituting a cartridge having a special check valve and tapered plug 17 secured to its lower end adapted to detachably fit the socket 15, and also being provided at its upper enlarged end with a beverage delivery spout 18; a strainer 19 confined within the upper portion of the cartridge 16 by a removable cover 20 and an annular expansion spring 21 suspended therefrom; a vertically movable supporting plate 22 for receiving successive portable and transparent final beverage receptacles 23 so that their pouring spouts or orifices 24 are in direct communication with the cartridge delivery spout 18, the plate 22 having a warmer heater 25 associated directly therewith; and an electrical control system for the various automatic heaters 8, 9, 25, and other elements, including a starting button switch 26, and a button stop switch (not shown).

The main housing 6 may be formed of attractive shape, of sheet metal or the like, and may be mounted on anti-friction roller supports 29 or the like, and the liquid supply and heating chamber 7 may be suspended from a removable cover 30 forming a part of the elevated rear portion of the housing. The chamber 7 besides having the main and auxiliary heaters 8, 9 therein, should also be provided with a thermostat and switch 31 for controlling the maximum temperature attainable in the confined liquid.

The improved coffee grounds confining cartridge 16 which constitutes an important feature of my present improvement consists primarily of a transparent inverted conical container formed of glass or the like, and having a gradually upwardly enlarging transverse cross-section. The lower end of the cartridge is provided with a depending beaded flange 33 to which the valve plug 17 is firmly attached, as indicated in Fig. 3, and the tapered plug 17 is formed of rubber or similar material and has a slit type of automatic check valve 34 formed integral therewith. This valve 34 will obviously permit hot liquid to flow from the supply chamber 7 into the lower constricted end of the cartridge 16, but will positively prevent reverse flow or dripping when the plug 17 is removed from the socket 15. The cartridge 16 is adapted to receive a batch c of coffee grounds or the like, as shown in Fig. 1, and the final beverage delivery spout 18 projects outwardly over the upper larger end of the housing and may be directed into the receiving spout or opening 24 of the receptacle 23 when resting upon the movable plate 22 as depicted in Fig. 1.

The cover 20 may be swingably attached to the upper end of the cartridge by means of a hinge 36 and has its swinging end provided with a pivoted latch 37 adapted to hook beneath the spout 18; and the annular expansion spring 21 which is adapted to resiliently engage the tapered inner surface of the cartridge 16 may be suspended from the center of the cover 20 by means of a support 38. The renewable strainer 19 may be formed of suitable cloth and is capable of being stretched across and firmly but detachably secured to the spring 21 with the aid of a draw string 39, and the cover 20 may also be provided with a handle 40 for effecting opening and closing thereof. When the cover 20 is closed and latched, the resilient spring 21 will keep the strainer cloth stretched across and in snug engagement with the inclined inner surface of the cartridge casing, so that no coffee grounds c can escape with the final beverage. The coffee dispensing receptacles 23 are preferably formed of transparent material such as glass and in the shape of decanters with manipulating handles 41.

There may be any number of these portable receptacles 23 provided, and while the supporting plates with which the warming heaters 32 cooperate, may be fixedly mounted upon the housing 6, the plate 22 with which the warmer heater 25 is associated, is mounted for vertical movement upon a scale mechanism whose details form no part of this invention. While a receptacle 23 is being supplied with beverage, it is preferable to have the heater 25 on, but when the receptacle has been loaded sufficiently to move the plate 22 downwardly, both the warmer heater 25 and the main fresh water heater 8 are preferably thrown off. If the beverage laden receptacle is permitted to remain upon the supporting plate 22 after it has reached its lowermost position, the warming heater 25 should again be thrown on and the auxiliary water heater 9 should also be retained in action while the main heater 8 remains off. All such mechanism is foreign to the invention herein claimed, and hence is not included in the drawings.

In operation, the hot water introduced at the bottom of the cartridge will rise toward the top and carry with it the coffee grounds which have been added to make up the infusion. It is always difficult to separate these grounds from each other so that they may yield up the maximum of flavor and aroma to the infusion. This I accomplish by flaring outwardly the walls of the cartridge so that as the grounds ascend with the water the cross sectional area will progressively increase thereby laterally enlarging the liquid body in its upward movement. As a result, the grounds will be urged upwardly and outwardly to insure an even distribution throughout the infusion. At the top the grounds are stopped by the strainer at a point slightly below the level of the pouring spout, and in consequence are restrained from passing out when clear infusion is to be withdrawn.

The strainer also has certain advantageous features in that the annular ring which supports the fabric or other foraminous sheet is expansible so as to remain in tight-fitting engagement with the interior of the cartridge at a point near the top. The vertical position of the strainer is fixed by that of the cover to which it is attached. When the cover is swung down to fully closed position, the strainer will also be forced downwardly so as to engage tightly the flaring walls of the cartridge thereby assuring that there will be no appreciable leakage around its periphery.

In commercial coffee brewing apparatus involving the use of a cartridge in which coffee is made by batches, there is always the problem of preventing leakage when the cartridge is disconnected from the water supply as must be done from time to time. In the present cartridge I accomplish this in a very simple manner, and by means which is always relied upon to effect a fluid-tight connection between the cartridge and the water supply. For this purpose the resilient plug of rubber or the like is fixedly secured to the bottom of the cartridge so as to depend therefrom and provide a support therefor when fitted into the upwardly-facing flaring mouth of the water supply. This operation is exceedingly simple and may be readily performed with assurance of uniform results.

I claim:

1. In combination, an inverted conical container for beverage producing material having a valved inlet opening at the lower apex end and a discharge spout at the upper base end, a cover for the container, means for hinging the cover to the container, an annular spring resiliently cooperable with the inclined inner surfaces of the container below the spout, a beverage strainer stretched across and firmly secured to the spring and in snug engagement with said inclined inner surfaces of the container, means carried by the cover for forcing the spring downwardly into tight compressive engagement with the inclined surfaces of the container when the cover is closed, and means for latching the cover in its closed position and for maintaining the spring in its tight compressive engagement with the container.

2. In combination, an inverted conical container for beverage producing material having a valved inlet opening at the lower apex end and a discharge spout at the upper base end, a cover for the container, means for hinging the cover to the container, an annular spring resiliently cooperable with the inclined inner surfaces of the container below the spout, a beverage strainer stretched across and firmly secured to the spring and in snug engagement with said inclined inner surfaces of the container, a support secured to and depending from the cover and connected to the spring whereby the spring and the beverage strainer will be carried by the cover in the opening and closing movements thereof, said cover, in its closing movement, forcing the spring downward into tight compressive engagement with the inclined surfaces of the container, and means for latching the cover in its closed position to maintain the spring in its compressive engagement with the container.

3. In combination, an inverted conical container for beverage producing material having a valved inlet opening at the lower apex end and a discharge spout at the upper base end, a cover for the container, means for hinging the cover to the container, an annular spring resiliently cooperable with the inclined inner surfaces of the container below the spout, a beverage strainer stretched across and firmly secured to the spring and in snug engagement with said inclined inner surfaces of the container, a support secured to and depending from the cover and connected to the spring whereby the spring and the beverage strainer will be carried by the cover in the opening and closing movements thereof, said cover, in its closing movement, forcing the spring downward into tight compressive engagement with the inclined surfaces of the container, and a pivoted latch carried by the cover and arranged to hook under the spout of the container for maintaining the cover in its closed position and the spring in its compressive engagement with the container.

HERBERT W. PETERS.

REFERENCES CITED

The following references are of record in the file of this patent:

UNITED STATES PATENTS

| Number | Name | Date |
|---|---|---|
| 190,964 | Etzensberger | May 22, 1877 |
| 1,509,916 | Waite | Sept. 30, 1924 |
| 1,978,561 | Battilani | Oct. 30, 1934 |
| 2,070,377 | Simmons | Feb. 9, 1937 |
| 2,314,018 | Sanderson | Mar. 16, 1943 |
| 2,346,389 | Peters | Apr. 11, 1944 |
| 2,409,226 | Schlumbohm | Oct. 15, 1946 |

FOREIGN PATENTS

| Number | Country | Date |
|---|---|---|
| 229,883 | Germany | Jan. 10, 1911 |
| 512,759 | France | Oct. 22, 1920 |